Patented Jan. 8, 1935

1,986,808

UNITED STATES PATENT OFFICE 1,986,808

SULPHONATED OIL

Richard Greenhalgh, Blackley, Manchester, England, assignor to Imperial Chemical Industries Limited, a corporation of Great Britain No Drawing. Application July 6, 1933, Serial No. 679,265. In Great Britain July 18, 1932

8 Claims. (Cl. 87—12)

This invention relates to sulphonated oils, more particularly sulphonated hydroxy fatty acid substances, such as sulphonated castor oil, and a process for the production thereof.

The value of sulphonated castor oils for many purposes depends on how they are sulphonated. What happens when castor oil is treated with sulphonating agents is still incompletely elucidated, but as available knowledge goes one factor on which the usefulness depends is the extent to which combination with sulphuric acid radicals has taken place, but that is dependent again on the direction in which the reaction has proceeded. Another controlling factor is the extent to which hydrolysis, polymerization, radical exchange, etc., in the fatty acid and glyceryl radicals have occurred.

All these variable factors depend on the conditions under which the sulphonation treatment has been carried out, i. e., chiefly on the strength of the acid used and the temperature of the reaction mixture. It follows that turkey-red oils vary largely in technical value.

Many processes for the manufacture of oils more highly sulphonated than Turkey-red oil have been proposed, the aim having been that of producing substances adapted to be used in hard water, in the presence of acid, and, in general, possessed of properties making them generally more valuable for textile purposes. In British specification No. 357,670 processes of this nature were described, and the present invention represents the outcome of further investigations along the same lines.

This invention has as an object the production of new and improved sulphonated oils which are characterized especially by unusual stability towards acids and superior wetting properties. A further object is the provision of a new and improved process for the production of products of the character above described. Other objects will appear hereinafter.

It has now been found that if acetylated castor oil or acetylated ricinoleic acid is dissolved in sulphur dioxide and treated with sulphur trioxide or "oleum", a highly sulphonated product, adapted for use in hard water and containing much fixed sulphuric acid radical, is obtained.

The usefulness of liquid sulphur dioxide as a medium in which to effect sulphonations (both true sulphonation and sulphuric esterification) of aliphatic and aromatic hydrocarbons, phenols, fatty oils and fatty acids has been shown in United States patent specification No. 1,422,564, Journal of the Chemical Society, 1926, page 684, and in British patent specification No. 346,945, but it could not have been expected that products of such superior properties would have been obtained by using liquid sulphur dioxide as a medium in carrying out the process described in British specification No. 357,670.

Grun (Berichte der deutschen chemischen Gesellschaft, 1906, vol. 39, page 4400) described treating acetylated castor oil with a molecular proportion of sulphuric acid, and states that the acetyl group is displaced by the sulphuric radical. A sulphuric radical thus bound can readily be removed by hydrolysis with hot dilute mineral acid, as in the customary method for determining combined $SO_3$ in Turkey-red oils (cf. Hart, Journal of Industrial and Engineering Chemistry, 1917, 9, 851). The products of the present invention, on the other hand, are extraordinarily stable towards hot mineral acid of the concentration used in this analytical test, and so appear to contain little or no combined $SO_3$ when subjected to analysis in the manner referred to.

Although the product of Example I (below) possesses great stability to hot mineral acid, an even superior product is obtained when, instead of acetylated castor oil, acetylated ricinoleic acid is used as described in Example II. It may be that this superiority of the product in respect of wetting properties and stability in hard water is related to the fact that on boiling ricinoleic acid with acetic anhydride an anhydride of the acetyl derivative is obtained, to which the formula

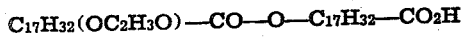

$$C_{17}H_{32}(OC_2H_3O)—CO—O—C_{17}H_{32}—CO_2H$$

has been given (see Lewkowitsch, Chemical Technology, and Analysis of Oils, Fats, and Waxes, 6th edition, London, 1921, page 220).

The invention is illustrated, but not limited, by the following examples, in which the parts are by weight.

Example I

Sixty parts of castor oil and 120 parts of acetic anhydride were mixed together. The mixture was boiled in a vessel provided with a reflux condenser for two hours. The excess of acetic anhydride, together with the acetic acid produced during the reaction, was then removed by distillation under diminished pressure. The residuum was a viscous oil; it was then cooled to —15° C. by external cooling and 200 parts of liquid sulphur dioxide were added, with stirring. To this mixture was added during fifteen minutes a solution of 48 parts of sulphur trioxide in 200 parts of liquid sulphur dioxide, previously cooled to −15° C. The temperature rises to the boiling point of liquid sulphur dioxide, because the reaction generates heat.

The cooling bath was removed and the temperature raised to 20° C. until all sulphur dioxide had been driven off. The oily residue was neutralized with 150 parts of 25% aqueous caustic soda solution, and the mixture cooled to 15° C. The crystalline sodium sulphate which separated was removed by filtration.

The product (230 parts) was a bright clear yellow liquid. When diluted with about 50 parts of water, the solution was only rendered turbid by large additions of mineral acid or hard water. This dilute solution had a rapid wetting out and penetrating action on textile materials.

It exhibited an extraordinarily high stability to acids.

Example II

One hundred parts of castor oil fatty acids (principally ricinoleic acid) and 200 parts of acetic anhydride were heated together at 130° C. to 135° C. for three hours, and the excess of acetic anhydride, together with the acetic acid formed, was removed by distillation under diminished pressure. The residue amounted to 105 parts.

This was dissolved in 200 parts of liquid sulphur dioxide at −15° C. Eighty parts of "oleum" of 65% $SO_3$ were then added slowly, with stirring, the temperature being kept at −10° C. to −8° C. When all was added, about 500 parts of 12% aqueous caustic soda were added, the temperature being allowed to rise and sulphur dioxide being allowed to boil off. Caustic soda was added until the mixture no longer reacted acid to Congored. It was then allowed to stand until the lower layer of sodium sulphate solution could be decanted away. The oily layer was cooled to 0° C. to 5° C. and crystallized sodium sulphate was filtered off. To the remaining oil, water was added to give in all 290 parts. The product was thus in approximately 50% solution. It was a clear brownish yellow liquid. In acid stability it was superior to the product of Example I.

Similarly, other hydroxy fatty acid substances may be sulphonated in accordance with the process of the invention. It should be noted, however, that castor oil and ricinoleic acid are the principal substances of this character available commercially.

The products have a wide application, particularly as wetting agents in the textile industry, and are rendered especially valuable on account of their superior properties as compared with previously known substances of the Turkey-red oil type.

As many apparently widely different embodiments of this invention may be made without departing from the spirit and scope thereof, it is to be understood that I do not limit myself to the specific embodiments thereof except as defined in the appended claims.

I claim:

1. A sulphonated product obtainable by reacting an acetylated hydroxy fatty acid substance with sulphur trioxide in liquid sulphur dioxide, said product being characterized in that the sulphur present therein is not removed to any substantial extent by hydrolysis with hot dilute mineral acid as in the customary method for determining combined sulphur trioxide in Turkey-red oils.

2. A sulphonated oil obtainable by reacting acetylated castor oil with sulphur trioxide in liquid sulphur dioxide, said oil being characterized in that the sulphur present therein is not removed to any substantial extent by hydrolysis with hot dilute mineral acid as in the customary method for determining combined sulphur trioxide in Turkey-red oils.

3. A sulphonated oil obtainable by reacting acetylated ricinoleic acid with sulphur trioxide in liquid sulphur dioxide, said oil being characterized in that the sulphur present therein is not removed to any substantial extent by hydrolysis with hot dilute mineral acid as in the customary method for determining combined sulphur trioxide in Turkey-red oils, and having superior wetting properties and stability to hard water to the product of claim 2.

4. The process which comprises sulphonating an acetylated hydroxy fatty acid substance with sulphur trioxide in liquid sulphur dioxide.

5. The process which comprises sulphonating acetylated castor oil with sulphur trioxide in liquid sulphur dioxide.

6. The process which comprises sulphonating acetylated ricinoleic acid with sulphur trioxide in liquid sulphur dioxide.

7. The process which comprises refluxing castor oil with acetic anhydride, and sulphonating the acetylated product with sulphur trioxide in liquid sulphur dioxide.

8. The process which comprises refluxing ricinoleic acid with acetic anhydride, and sulphonating the acetylated product with sulphur trioxide in liquid sulphur dioxide.

RICHARD GREENHALGH.